United States Patent Office 3,759,886
Patented Sept. 18, 1973

3,759,886
BIODEGRADABLE EMULSIFIERS FOR POLYCHLOROPRENE
Nathan L. Turner, Houston, Tex., assignor to Petro-Tex Chemical Corporation, Houston, Tex.
No Drawing. Filed May 17, 1971, Ser. No. 144,226
Int. Cl. C08f 1/13, 3/32
U.S. Cl. 260—92.3         5 Claims

ABSTRACT OF THE DISCLOSURE

Use of octyl sulfate salts as emulsifying agents in chloroprene polymerization. Octyl sulfate salts are biodegradable and replace the nonbiodegradable salts of the condensation product of naphthalene sulfonic acids and formaldehyde.

---

Neoprene, or polychloroprene, is conventionally polymerized in emulsion polymerization utilizing a combination of emulsifying agents. Conventionally, emulsifying agents are such as rosin acid salts and various secondary emulsifiers. Some of the emulsifying agents may remain in the polymer but certain water soluble emulsifiers are substantially removed before final isolation and processing of the polymer. These emulsifiers that are removed are sometimes referred to as secondary emulsifiers. For example, the polymer may be recovered by coagulation of the latices and thereafter the water soluble emulsifiers removed before final milling. The water soluble emulsifiers are removed, for example, by washing the polymer with warm water on a wash belt. This washing may be assisted by extraction by use of solvents which dissolve the emulsifying agents but which do not dissolve the polymer e.g. solvents such as alcohol. Normally, the washing requires the use of large volumes of water and if the emulsifying agents are biodegradable this water may be processed by bio-oxidative degradation; however, if the wash water contains non-biodegradable emulsifying agents elaborate and expensive procedures must be employed to remove the non-biodegradable emulsifiers prior to treatment of the wash water in a bio-oxidative degradation system to remove the biodegradable emulsifiers. It is an object of this invention to eliminate this costly processing of the wash water to remove nonbiodegradable emulsifiers.

The polymerization of chloroprene is a complicated process and the emulsification sysem is an integral part of this process. Emulsifying agents must meet certain exacting standards to be satisfactory. Not only must the emulsifiers function during the emulsion polymerization step but they must also perform satisfactorily during the recovery, drying and processing of the polymer. Furthermore, residual emulsifier should not adversely effect the final product. As is well known, there are literally hundreds of commercial emulsifiers and the reason there are hundreds of emulsifiers is that the characteristics of emulsifiers are very specific and must be tailored to particular uses. Therefore, the selection of emulsifiers in any field has become an art which has not been readily subjected to scientific study.

In the polymerization of chloroprene, it has been the practice to frequently include as one of the emulsifiers a salt of the condensate product of naphthalene sulfonic acids and formaldehyde such as disclosed in U.S. Pats. 2,046,757 and 2,264,173. This type of emulsifier is employed to increase the stability of latices especially when the emulsion contains high concentration of electrolytes or in instances in which the other emulsifying agents are poor dispersing agents for the solid polymer. The formaldehyde-naphthalene sulfonic acid condensation products are excellent emulsifiers and, accordingly, have been incorporated in commercial recipes. However, these emulsifiers are washed out of the polymer and are for practical purposes nonbiodegradable because the aromatic portion of the salt renders it immune or very resistant to bacteriological decay.

Attempts have been made to substitute biodegradable emulsifiers for the formaldehyde-naphthalene sulfonic acid condensation products, but considerable difficulties have resulted in various steps of the overall process. Some biodegradable emulsifiers did not perform satisfactorily during the preparation of the polymerization emulsion and during the polymerization step. Some biodegradable emulsifiers produced excessive quantities of foam during preparation of the water phase of the emulsion making the solutions difficult to handle. In some cases excessive foam was formed during the emulsification procedure prior to polymerization. Some biodegradable emulsifiers were found to give satisfactory stabilization when added to the latex after polymerization, but when present during the polymerization lost their effectiveness as stabilizing agents, particularly at low pH.

The emulsifiers must also perform satisfactorily during further processing of the polymer. For example, it is conventional to isolate neoprene from the latex by continuous coagulation of a polymer film on a freeze drum followed by washing and drying. The latex is first acidified with an agent such as acetic acid and thereafter fed to a freeze roll which rotates partly immersed in the latex. This freeze roll is cooled to a temperature such as $-15°$ C. by circulating brine. In this process the latex is frozen on the drum and is coagulated as the drum revolves. The coagulated film is stripped from the roll by a stationary knife and is placed on a continuous belt where it is thawed and washed.

Prior to acidification and recovery the emulsifiers must function to properly assist in the isolation and recovery of the polymer. One of the functions of the formaldehyde-naphthalene sulfonic acid emulsifiers is to prevent coagulation of the latex prior to the freeze drum. These emulsifiers are acid stable and prevent such coagulation. Thus, any replacement must satisfactorily maintain the stability of the latex during acidification. Further, the emulsifiers must allow for normal stripping of the film from the freeze drum and preferably will assist the stripping operation.

Another necessary characteristic of the secondary emulsifier is that it must be easily washed from the coagulated film and preferably be essentially removed from the polymer prior to the final processing. Residual quantities left must not substantially adversely change the physical properties. Thus, it was a principal object of this invention to discover a biodegradable emulsifier to replace the salts of the condensation product of naphthalene sulfonic acid and formaldehyde.

According to this invention polymers of chloroprene, 2-chloro-1,3-butadiene, are polymerized using an alkali metal or ammonium octyl sulfate as an emulsifier. This type of emulsifier is biodegradable. The term "polymers of chloroprene" encompasses polymers in which chloroprene is the major or predominant monomer. Comonomers may also be employed such as 2,3-dichloro-1,3-butadiene; acrylonitrile, methyl methacrylate and so forth. Usually, then a total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization of chloroprene are disclosed, for example, in Encyclopedia of Polymer Science and Technology, vol. 3, pp. 705–730 (Interscience, 1965) and in numerous patents such as U.S. Pats. 2,264,173 and 2,264,191, both issued on Nov. 25, 1941. The polymerization may be conducted either batch or continuously.

In addition to the alkali metal or ammonium octyl sulfate emulsifier conventional emulsifiers may also be employed such as the salts of rosins and rosin derivatives such as wood rosin, disproportionated rosin or hydrogenated rosin; ammonium, sodium or potassium salts of long chain fatty acids; nonionic surface active agents such as the ethylene oxide or propylene oxide condensation products of compounds containing reactive hydrogen atoms. Additional emulsifying agents are disclosed in U.S. Pat. 2,264,173. However, in order to obtain the maximum benefits of this invention any emulsifier which will be washed out with the wash water should be biodegradable at least to some extent. A preferred emulsifier to be used in conjunction with the octyl sulfates are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731–S).

The pH of the aqueous emulsion for the polymerization may be varied depending upon the particular emulsification system employed and can be acidic, neutral or alkaline; however, it is preferred to have a pH in the range of about 7 to 13.5. It is also a feature of this invention that preferred results are obtained when the pH is maintained within the range of 10 to 13.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha, alpha'-azo-bis-isobutyronitrile and the like. Suitable inorganic peroxides are such as inorganic per acids including per sulfates, perborates or percarbonates e.g. ammonium or potassium per sulfate and hydrogen peroxide. The catalyst may be used in amounts required to bring about polymerization at any desired rate with suitable ranges being from .001 to 0.5 part by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The octyl sulfate with or without other emulsifiers may be added at any stage during polymerization or may be fed during polymerization. Alternatively, the octyl sulfate may be added to the preformed latex either before or after monomer is removed such as by steam distillation. The only requirement is that the octyl sulfate be present at least during acidification of the latex prior to coagulation. However, because the emulsifiers usually reduce the viscosity of the emulsion during polymerization it is preferred to incorporate the octyl sulfate salt into the recipe prior to or during polymerization. Although the amount of octyl sulfate is not critical certain proportions have been discovered to give superior results and within the range of from about .05 to 2.0 parts by weight of the octyl sulfate compound per 100 parts of polymerizable monomers are usually employed with a preferred range being from about .1 to 1.0 part per 100 parts of monomer.

The usual modifiers or other agents may be present in the emulsion. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide. Water soluble iron salts e.g. ferrous sulfate or iron chelates may be suitably employed.

Normally, the polymerization would be conducted in an oxygen free or substantially oxygen free atmosphere such as use of an inert gas. However, in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 and 90 percent conversion. The temperature of polymerization may be varied depending upon the particular type of polymer being employed with suitable ranges being from 0° to 90° C. with the preferred range being between 15° C. and 55° C.

The polymerization may be shortstopped by the addition of agents such as para-tertiary-butyl catechol and thiodiphenylamine. The process of polymerization may be either continuous or may be conducted in batch.

The octyl sulfate salts may be any of the alkali metal or ammonium octyl sulfate salts. Preferred are the sodium, lithium or potassium salts and mixtures thereof with the sodium salts being particularly preferred. The octyl portion of the emulsifier should preferably be normal but in some instances branch chain sulfates, such as 2-ethyl hexyl, may be employed.

In the following examples various biodegradable emulsifiers were tested as a replacement for the salts of the condensation product of naphthalene sulfonic acid with formaldehyde. (Commercial condensation products of this type are such as Lomar PW produced by Nopco and Daxad-15 produced by W. R. Grace.) The other emulsifiers tested are reported to be biodegradable.

In the examples all parts are by weight unless expressed otherwise.

EXAMPLES 1 TO 21

A mercaptan-modified neoprene latex in which the secondary emulsifier or surfactant was omitted was prepared using the following recipe:

| Polymerization charge: | Con. in parts by weight |
| --- | --- |
| Chloroprene | 100 |
| 2,6-ditertiary - butyl para-cresol | 0.1 |
| Resin-731S [1] | 4.0 |
| Deionized water | 100 |
| Sodium hydroxide (100 percent) | 0.6 |
| n-Dodecyl mercaptan (100 percent) | 0.235 |
| Initial catalyst: | |
| Sodium hydrosulfite | 0.0294 |
| Deionized water | 0.588 |
| Pumped catalyst: .358 percent potassium persulfate in aqueous solution used as required to maintain the polymerization rate. | |

[1] A disproportionated wood rosin, purified by distillation and sold by Hercules Powder Co.

The polymerization is carried out under a nitrogen blanket at a temperature of 40° C. At 70 percent conversion the reaction is shortstopped with an emulsion containing 0.01 part t-butyl catechol, 00.1 part phenothiazine, 0.8 part chloroprene, 0.02 part sodium dodecyl benzene sulfonate, and 0.8 part deionized water. The latex is then steam distilled to remove the unreacted chloroprene and split into 1000 gram aliquots. The amount of experimental surfactant needed for addition to the latex to give a recipe amount of 0.7 part per hundred monomer (phm.) is calculated. This calculation is based on the amount of non-volatiles in the latex assuming a negligible loss of surfactant during steam-distillation. The amount of surfactant required per 1000 grams of latex is found to be 3.94 grams. This quantity of experimental surfactant is added to each 1000 gram latex sample just prior to acidification. To assure that each surfactant is in solution and adequately mixed into the latex each surfactant is dissolved in 25 mls. of deionized water and then added in a single dose while the latex is stirred vigorously. The pH of the latex is acidified by adjusting to pH 5.8 with 10 percent by volume acetic acid solution. During this procedure, the relative amount of foaming and effect on latex color was noted. After the acidification is completed, the amount of coagulum on the stirring blade was noted. The results are listed as Examples 1 to 21 in the table. The non-diodegradable standard is Lomar-PW.

From Examples 1 through 21 it may be seen that most of the surfactants were unsatisfactory because of either coagulation, foaming or color problems. However, the disodium ethoxylated alcohol half ester of sulfosuccinic acid; sodium octyl sulfate and the diisobutyl sodium sulfosuccinimate appeared promising and were tested in polymerizations in Examples 22 through 25. The polymerization recipe used is identical to the one used in preparing the latex for Examples 1 through 21 except in this case the surfactants were included in the polymerization recipe.

| Ex. | Trade name | Chemical classification | Coagulation formation on acidification |
| --- | --- | --- | --- |
| 22 | Lomar-PW | Sodium salt of condensation product of formaldehyde and naphthalene sulfonic acid. | Normal. |
| 23 | Duponol-80 | Sodium octyl sulfate | Very slight. |
| 24 | Monawet MB-70 | Diisobutyl sodium sulfosuccinimate. | Extreme. |
| 25 | Aerosol-A102 | Disodium ethoxylated alcohol half ester of sulfosuccinic acid. | Do. |

From the results it may be seen that only the sodium octyl sulfate compound is satisfactory of these materials tested.

EXAMPLES 26 AND 27

The suitability of the octyl sulfate salt emulsifiers is further compared with the naphthalene sulfonic acid standard in comparative runs Examples 26 and 27. The

ACIDIFICATION OF LATEX/DISPERSANT MIXTURES

| Ex. | Trade name | Chemical classification | Manufacturer | Coagulation | Foaming | Color effects |
| --- | --- | --- | --- | --- | --- | --- |
| 1 | Lomar-PW | Sodium naphthalene sulfonate | Nopco Chemical Co | None | None | Very slight. |
| 2 | Duponol-80 | Sodium octyl sulfate | E. I. du Pont de Nemours | do | Slight | None. |
| 3 | Triton X100 | Octyl phenoxy polyethoxy ethanol | Rohm and Haas Co | Extreme | do | Do. |
| 4 | Aerosol-22 | Tetrasodium N-(1,2-dicarbosy-ethyl)-N-octadecylsulfosuccinimate. | American Cyanamid Co. (Industrial Chem. Div.). | None | do | Do. |
| 5 | Aerosol-A102 | Disodium ethoxylated alcohol half ester of sulfosuccinic acid. | do | do | None | Do. |
| 6 | Dowfax-3B1 | Sodium-N-nonyl-diphenyl ether disulfonate. | Dow Chemical Co | do | Moderate | Do. |
| 7 | Actrafos-110 | Not known | Arthur C. Trask Co | Moderate | Slight | Do. |
| 8 | Emulphor-ON870 | Polyoxyethylated fatty alcohol | GAF Corporation (Dyestuff and Chem. Div.). | Extreme | Excessive | Do. |
| 9 | Peritan NH$_4$ | Desugared and desalted ammonium lignosulfonate. | Arthur C. Trask Co | Coags. badly on standing after acidification. | None | Dingy, off-white. |
| 10 | Monawet MB-70 | Diisobutyl sodium sulfosuccinimate | Mona Industries, Inc | None | Slight | None. |
| 11 | Ethoxyol-5 | Lanolin alcohol/ethylene oxide reaction product. | Malmstrom Chemical Corp | Extreme | do | Do. |
| 12 | Launette Special | Not known | Procter and Gamble Co | Moderate | Moderate | Do. |
| 13 | Orvus AB | Sodium linear alkyl aryl sulfonate | do | do | do | Do. |
| 14 | Varonic K215 | Ethoxylated coco amine | Varney Chemical Div | Excessive | V. slight | Do. |
| 15 | Orzan-G | Lignin sulfonate | Crown Zellerbach Co. (Chemical Products Div.). | do | Slight | Turned slight pink. |
| 16 | Orzan-S | Sodium lignin sulfonate | do | do | do | Do. |
| 17 | Actrasol-WIT | Sodium alkyl sulfonate | Arthur C. Trask Co | None | Moderate | None. |
| 18 | Emcol-K8300 | Acyclic complex amine sulfonate | Witco Chemical Corp. (Ultra Div.). | do | Excessive | Do. |
| 19 | Emcol D5-10 | Sodium 2-ethyl hexyl sulfate | do | do | Slight | Do. |
| 20 | Sulframin-OBS Flakes. | Sodium salt of linear alkyl aryl sulfonic acid. | do | do | do | Do. |
| 21 | Merpol-OJ | Ethylene oxide condensate | E. I. du Pont de Nemours | Extreme | None | Do. |

EXAMPLE 22

Example 22 is a control polymerization using the non-biodegradable Lomar-PW (sodium salt of the condensation product of formaldehyde and naphthalene sulfonic acid) as the secondary emulsifier. 0.70 part by weight of the 87 percent active material is used per 100 parts of chloroprene.

EXAMPLE 23

Example 23 illustrates this invention and employs 0.33 part by weight per 100 parts chloroprene of sodium octyl sulfate as the secondary emulsifier added as a 33 percent by weight aqueous solution.

EXAMPLE 24

Example 24 employs diisobutyl sodium sulfosuccinimate (Monawet MB-70) as the secondary emulsifier in the amount of .33 part per 100 parts chloroprene. This is added as a 70 percent by weight aqueous solution (paste).

EXAMPLE 25

Example 25 employs 0.33 part of disodium ethoxylated alcohol half ester of sulfosuccinic acid (Aerosol-A102) added as a 30 percent by weight aqueous solution.

following recipes are used to prepare mercaptan-modified polychloroprene. All concentrations are parts by weight per 100 parts chloroprene.

|  | Example 26 | Example 27 |
| --- | --- | --- |
| Polymerization charge: |  |  |
| Chloroprene | 100 | 100 |
| 2,6-ditertiary-butyl para-cresol | 0.1 | 0.1 |
| Resin-731SA | 4.0 | 4.0 |
| Deionized water | 100 | 100 |
| Sodium hydroxide (100 percent) | 0.6 | 0.6 |
| N-dodecyl mercaptan (100 percent) | 0.235 | 0.235 |
| Secondary emulsifier | (a) | (b) |
| Initial catalyst: |  |  |
| Sodium hydrosulfite | 0.0294 |  |
| Deionized water | 0.588 |  | a 0.70 part Lomar-PW (87 percent active), sodium salt of the condensation product of formaldehyde and naphthalene sulfonic acid. Dissolved in water phase of polymerization emulsion.
b 0.33 part of sodium octyl sulfate added as a 33 percent by weight aqueous solution. Dissolved in water phase of polymerization emulsion Pumped catalyst .35 percent potassium persulfate in aqueous solution used as required to maintain the polymerization rate.

These polymerizations are carried out at 40° C. under a nitrogen blanket to 70 percent conversion. They are shortstopped with an emulsion identical to that used to shortstop the polymerization used in Examples 1 through 21. These two latexes were then stripped of unreacted monomer by steam distillation and acidified to pH 5.8 with 10 percent acetic acid solution. No excessive coagulum was noted to be formed during acidification of either sample. These are then isolated and their physical properties compared. The results are shown in Table I.

TABLE I

|  | Example 26 | Example 27 |
|---|---|---|
| Mooney viscosity,[1] ML-2½/4 | 47/44 | 55/50 |
| Δ Mooney after 3 days at 70° C | +3/+2 | +2/+2 |
| Mooney scorch,[1] time to 5 pt. rise | 16.8 | 16.2 |
| Shore A hardness,[2] pts | 36.5 | 36.0 |
| Tensile,[3] p.s.i | 2,875 | 2,850 |
| Modulus[3] at 300 percent elongation, p.s.i | 175 | 175 |
| Modulus at 600 percent elongation, p.s.i | 525 | 525 |
| Elongation, percent | 940 | 930 |
| Monsanto Rheograph:[4] | | |
| Scorch, time to 1 in. lb. rise | 5.5 | 4.5 |
| Minimum torque, in. lbs | 9.5 | 10.5 |
| 40 minute torque ($T_{40}$), in. lbs | 47.5 | 49.0 |
| Time to 95 percent $T_{40}$, minutes | 33.0 | 33.5 |
| 80 percent cure rate, minutes | 17.0 | 16.5 |

[1] ASTM D1646-63.
[2] ASTM D2240-64T.
[3] ASTM D412-64T.
[4] Monsanto Rheometer—shows the curing characteristics of the rubber by continuously plotting torque (in. lbs.) vs. time (mins.). The various values give a numerical description of the cure. The 40 min. torque reading indicates the optimum state-of-cure of the rubber.

NOTE.—Under certain conditions the polychloroprene produced with sodium octyl sulfate was less stable when tested in a Brabender Plastocorder. This test is not known to have an ASTM test number.

EXAMPLES 28 AND 29

The following recipe is used to prepare a copolymer of chloroprene and sulfur. Example 28 is a comparative run and Example 29 illustrates the invention. All concentrations are parts by weight per 100 parts of chloroprene.

|  | Example 28 | Example 29 |
|---|---|---|
| Polymerization charge: | | |
| Chloroprene | 100 | 100 |
| 2,6-ditertiary-butyl para cresol | 0.1 | 0.1 |
| Nancy-Wood rosin | 4.0 | 4.0 |
| Sulfur | 0.35 | 0.35 |
| Diisopropyl xanthogen disulfide | 0.525 | 0.525 |
| Deionized water | 150 | 150 |
| Sodium hydroxide (100 percent) | 0.734 | 0.734 |
| Secondary emulsifier | (a) | (b) | a 0.750 part sodium salt of the condensation product of formaldehyde and naphthalene sulfonic acid (87 percent active).
b 0.33 part sodium sulfate added as a 33 percent by weight aqueous solution.

Catalyst system

An aqueous solution containing by weight 2.0 percent potassium persulfate and 0.1 percent sodium 2-anthaquinonesulfonate used as required to maintain the polymerization rate.

The polymerizations are carried out under a nitrogen blanket at 45° C. to 85 percent conversion. The reaction is shortstopped with the same composition as used for Examples 1 to 21. The samples are steam stripped to remove unreacted chloroprene, and then adjusted to pH 5.8 by addition of 10 percent acetic acid solution. No excessive coagulum is noted. The isolated polymers are evaluated as shown in Table II.

TABLE II

|  | Example 28 | Example 29 |
|---|---|---|
| Mooney viscosity, ML-2½/4 | 64/58 | 68/63 |
| Δ Mooney after 3 days at 70° C | −3/+8 | −2/+7 |
| Mooney scorch, time to 5 pt. rise | 36 | 33 |
| Shore A hardness, pts | 36.5 | 36.0 |
| Tensile, p.s.i | 2,925 | 2,925 |
| Modulus at 300 percent elongation, p.s.i | 175 | 175 |
| Modulus at 600 percent elongation, p.s.i | 450 | 475 |
| Elongation, percent | 970 | 975 |
| Monsanto Rheograph: | | |
| Scorch, time to 1 in. lb. rise | 7.2 | 6.5 |
| Minimum torque, in. bls | 5.0 | 5.0 |
| 40 minute torque ($T_{40}$) | 49.0 | 47.0 |
| Time to 95 percent $T_{40}$ | 31.7 | 30.3 |
| 80 percent cure rate | 11.1 | 10.0 |

Examples 28 and 29 illustrate that the octyl sulfate salt is a satisfactory replacement in a sulfur-chloroprene copolymer.

EXAMPLES 30 AND 31

To illustrate the superiority of the octyl sulfate salt over longer chain sulfate salts comparative runs are made in a standard mercaptan-modified polymerization recipe of the type used in Examples 26 and 27. In both examples 0.413 part by weight per 100 parts of chloroprene is employed. After steam stripping and acidification to pH 5.8, equal aliquots of each of the acidified latexes are subjected to rigorous shaking for 15 minutes. The coagulum forming in each sample was collected, dried and weighed and calculated. The superiority of the octyl sulfate can be seen by the lesser amount of coagulum formed.

| Secondary emulsifier: | Percent coagulum |
|---|---|
| Sodium octyl sulfate | 8.35 |
| Sodium lauryl sulfate | 20.82 |

The invention claimed is:

1. In a process for preparing polymers of chloroprene by emulsion polymerization in the presence of emulsifying agents and washing of the resultant polymer with water to remove water soluble emulsifying agents the improvement comprising using an octyl sulfate emulsifying agent comprising a member selected from the group consisting of alkali metal octyl sulfates, ammonium octyl sulfates and mixtures thereof, the said octyl sulfate is present in an amount of from about .05 to 2.0 parts by weight per 100 parts of polymerizable monomers.

2. The process of claim 1 wherein the said alkali metal in the alkali metal octyl sulfate is selected from the group consisting of potassium, sodium and lithium.

3. The process of claim 1 wherein the said alkali metal octyl sulfate is sodium octyl sulfate.

4. The process of claim 1 wherein the said emulsifying agents also comprise rosin salts.

5. The process of claim 1 wherein the said emulsifying agents comprise sodium octyl sulfate and a disproportionated wood rosin.

References Cited
UNITED STATES PATENTS

| 2,576,909 | 12/1951 | Adams | 260—85.1 |
| 3,190,865 | 6/1965 | Miller | 260—92.3 |
| 3,392,134 | 7/1968 | Apotheker | 260—29.7 |
| 3,535,392 | 10/1970 | Castrantas | 260—78.5 |
| 3,397,173 | 8/1968 | Collette | 260—45.9 |

JOSEPH L. SCHOFER, Primary Examiner

C. A. HENDERSON, JR., Assistant Examiner

U.S. Cl. X.R.

260—29.7 SQ, 85.5 XA, 86.3

UNITED STATES PATENT OFFICE
CERTIFICATE OF CORRECTION

Patent No. 3,759,886     Dated September 18, 1973

Inventor(s) Nathan L. Turner

It is certified that error appears in the above-identified patent and that said Letters Patent are hereby corrected as shown below:

Col. 1, line 46 reads "sysem" but should read -- system --.
Col. 4, line 60 reads "00.1" but should read -- 0.01 --.
Col. 5, line 8 reads "non-diodegradable" but should read -- non-biodegradable --
Col. 8, line (approx.) 10 reads "Minimum torque, in. bls" but should read -- Minimum torque, in lbs. --.

Signed and sealed this 26th day of February 1974.

(SEAL)
Attest:

EDWARD M. FLETCHER, JR.
Attesting Officer

C. MARSHALL DANN
Commissioner of Patents